United States Patent
Ghose et al.

(10) Patent No.: US 10,628,136 B2
(45) Date of Patent: Apr. 21, 2020

(54) INTERNET OF THINGS (IOT) APPLICATION DEVELOPMENT

(71) Applicant: TATA CONSULTANCY SERVICES LIMITED, Mumbai (IN)

(72) Inventors: Avik Ghose, Kolkata (IN); Arpan Pal, Kolkata (IN); Anirban Dutta Choudhury, Kolkata (IN); Tanushyam Chattopadhyay, Kolkata (IN); Plaban Kumar Bhowmick, Kolkata (IN); Dhiman Chattopadhyay, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/286,068

(22) Filed: May 23, 2014

(65) Prior Publication Data

US 2014/0351790 A1  Nov. 27, 2014

(30) Foreign Application Priority Data

May 24, 2013 (IN) .......................... 1851/MUM/2013

(51) Int. Cl.
*G06F 8/36* (2018.01)
*G06F 16/22* (2019.01)
*G06F 8/70* (2018.01)

(52) U.S. Cl.
CPC .................. *G06F 8/36* (2013.01); *G06F 8/70* (2013.01); *G06F 16/2228* (2019.01)

(58) Field of Classification Search
CPC ... G06F 8/36; G06F 8/315; G06F 8/30; G06F 8/33; G06F 8/70; G06F 16/2228
See application file for complete search history.

(56) References Cited

U.S. PATENT DOCUMENTS

| | | | |
|---|---|---|---|
| 8,015,547 B2* | 9/2011 | Harvey ...................... | G06F 8/20 717/117 |
| 8,359,572 B2* | 1/2013 | Mital ........................ | G06F 8/36 717/120 |

(Continued)

OTHER PUBLICATIONS

Krishnakumar, K. et al., "A Framework for IoT Sensor Data Analytics and Visualisation in Cloud Computing Environments," Distributed Computing Project COMP90019, University of Melbourne, Nov. 2011, 41 pages.

(Continued)

*Primary Examiner* — Todd Aguilera
(74) *Attorney, Agent, or Firm* — Seed Intellectual Property Law Group LLP (57) ABSTRACT

An application development system for development of Internet of Things (IoT) application includes a cataloging module to obtain an input from an application developer. The input comprises data related to the IoT application to be developed. The cataloging module further retrieves a plurality of reusable artefacts from a knowledge database based on the input. A recommendation module in the application development system recommends, to the application developer, artefacts from amongst the plurality of reusable artefacts, based at least on one of a feedback associated with each of the plurality of reusable artefacts, an expert analysis, and a combination of the expert analysis and the feedback. An association module in the application development system associates artefacts selected by the application developer with each other for development of the IoT application.

10 Claims, 4 Drawing Sheets

(56) References Cited

U.S. PATENT DOCUMENTS

| | | | | |
|---|---|---|---|---|
| 8,452,742 | B2* | 5/2013 | Hashimoto | G06F 8/71 707/695 |
| 8,676,853 | B2* | 3/2014 | Kasravi | G06F 8/36 707/792 |
| 2002/0188434 | A1* | 12/2002 | Shulman | G06F 8/36 703/21 |
| 2004/0172612 | A1* | 9/2004 | Kasravi | G06F 8/36 717/101 |
| 2007/0022106 | A1* | 1/2007 | Brandt | G06F 8/36 |
| 2008/0005287 | A1* | 1/2008 | Harvey | H04L 67/12 709/220 |
| 2008/0005721 | A1* | 1/2008 | Harvey | G06F 8/36 717/107 |
| 2009/0178026 | A1* | 7/2009 | Mital | G06F 8/36 717/120 |
| 2011/0055153 | A1* | 3/2011 | Hashimoto | G06F 8/71 707/622 |

OTHER PUBLICATIONS

Zheng, L. et al., "Technologies, Applications, and Governance in the Internet of Things," Internet of Things—Global Technological and Societal Trends, Smart Environments and Spaces to Green ICT, River Publishers, May 31, 2011.

\* cited by examiner

INTERNET OF THINGS (IOT) APPLICATION DEVELOPMENT

TECHNICAL FIELD

The present subject matter, in general, relates to Internet of Things (IoT), and in particular, relates to development of an IoT application.

BACKGROUND

With the rapid development of communication technology and further fusion of the communication technology with the Internet technology, the popularity of Internet of Things (IoT) is increasing day by day. The IoT is an emerging technology, combining different information sensing devices, such as radio frequency identifications (RFID), sensors, global positioning systems (GPS), and laser scanners, with internet to form a huge network.

The IoT is a vision of connectivity for anything, at anytime and from anywhere, which may have a dramatic impact on daily lives of people. It is recognized as an extension of today's Internet to the real world of physical objects, which is often associated with such terms as "ambient intelligence," "ubiquitous network," and "cyberphysical system." Various IoT platforms have been developed in the past that allow quick and easy development, deployment and administration of IoT applications. Environmental and personal health monitoring, monitoring and control of industrial processes including agriculture, smart spaces, and smart cities are some examples of the IoT applications.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Conventionally, various platforms are available that allow quick and easy development, deployment and administration of IoT applications. One such platform is RIPSAC (Real-Time Integrated Platform for Services & Analytics). RIPSAC is a platform for sensor data capture, storage, analytics, and visualization for development of sensor driven applications and services. RIPSAC services are made available in form of Application Programming Interfaces (APIs) and Software Development Kits (SDKs). However, RIPSAC does not provide sensor data analytics as a service for the IoT domain.

Further, developing IoT applications is becoming increasingly difficult with the conventional platforms, even though new languages, development processes and tools, platforms, standards and the like are being developed to support the application developers in application development. The application developers' lack of knowledge and experience is one of the major reasons of failure of development of IoT applications. In certain cases, even if the application developers possess the relevant theoretical knowledge, due to the peculiar nature of the IoT application it is difficult to apply the theoretical knowledge in a particular scenario. Further, the conventional platforms do not provide any mechanism to store the artefacts developed by various application developers for future use by other application developers. Owing to lack of reuse of the already developed artefacts, a lot of time and resources are wasted during application development.

The present subject matter describes systems and methods for development of Internet of Things (IoT) applications. The system as described herein, referred to as an application development system, is capable of developing an IoT application for an application developer.

Typically, all IoT applications have some common characteristic or phases. In an example, phases of an IoT application may include a sensing phase, an extraction phase, an analysis phase, and a response phase. In the sensing phase, the application may sense or collect data using sensors. In the extraction phase, the application processes the data to extract relevant information. Then the application analyzes the extracted data in the analysis phase and finally notifies the analyzed data to user(s) in the response phase.

For development of an IoT application, a plurality of artefacts is created, for each phase, by algorithm developers or application developers. The artefacts may include algorithms, functions, source codes, configuration scripts etc. For example, the algorithm developer may create sensing, extraction, analysis, and response algorithms. The artefacts corresponding to each phase may then be associated with each other to develop the IoT application.

According to the present subject matter, initially, a database for storing a plurality of artefacts created by various algorithm developers or application developers, related to each of the phases of the IoT applications, and metadata associated with each of the artefacts is maintained according to one implementation. The metadata for an artefact may include, but is not limited to, a type of sensor and a use case for which the artefact is developed, and a domain of the artefact, such as banking, a manufacturing or an insurance domain. The database referred herein can be an external repository associated with the application development system, or an internal repository within the application development system. In the description hereinafter, the database is referred to as a knowledge database. In one example, the artefacts stored in the knowledge database may be made available to application developers for reuse. In an implementation artefacts contained within the knowledge database may be updated, whenever required. For example, new artefacts may be added into the knowledge database, existing artefacts can be modified, or non-useful artefacts may be deleted from the knowledge database.

According to an implementation, feedback for each of the artefacts, received from the algorithm developers, may also be stored in the knowledge database. The feedback may also be received from users of the artefacts. In an example, the feedback may be received in form of ratings. The algorithm developers or the users of the artefacts may provide the feedback based on certain parameters, such as success rate of the artefact, use case, and frequency of the artefact being used. In said implementation, the feedback within the knowledge database may be updated whenever new feedback is received.

In one implementation, the artefacts stored in the knowledge database can be indexed in the knowledge database based on the metadata. Indexing enables easy retrieval of the artefacts from the knowledge database. In an example, the artefacts belonging to same kind of domain and same phase are grouped together. In another example, the artefacts related to same type of sensors, domain, and phase are grouped together.

The knowledge database thus contains the indexed artefacts and also the feedback received from various users and algorithm developers. The pre-stored artefacts, for each phase, can be retrieved by the application development system for the purpose of developing IoT applications. The pre-stored artefacts may interchangeably be referred to as reusable artefacts. In one implementation, the artefacts may be indexed and classified in real-time during development of the IoT application. The manner in which development of IoT application takes place is described henceforth.

The application developer may provide a dataset and a functionality to be performed on data in the dataset as an input to the application development system. The functionality that needs to be performed on the data may be one or more tasks to be performed by the IoT application to be developed. The dataset may include different phases of the application to be developed, types of sensors which may be suitable for the one or more tasks, subject on which the task is performed, and scenario in which the task is to be performed. Based on the application developer's input, the application development system retrieves corresponding groups of pre-stored artefacts from the knowledge database. In an implementation, the input provided by the application developer, i.e., the dataset and the one or more tasks, and the metadata may be compared to each other to retrieve groups of artefacts. The application development system may also retrieve feedback associated with the artefacts included in the groups. In an example, if the application developer specifies that the task is to recognize number plates of the cars. Further, the application developer provides a dataset with data, for example, sensor is a camera, phases involved are sensing, extracting, and analyzing, subject is a small area, and scenario is a night time. Based on the one or more task and the dataset, the application development system may retrieve all the algorithms associated with the dataset and the one or more task. For example, the application development system may retrieve a plurality of artefacts related to the extraction phase, the analysis phase, camera, night time, and small area.

According to an implementation, based on the feedback associated with the artefacts, recommendations are provided to the application developer. In one implementation, highly rated set of artefacts, say 5 top rated artefacts may be recommended to the application developer, for a particular dataset. In said implementation, highly rated set of artefacts, for each phase, may be recommended. The application developer may then select one or more artefacts from the recommended set of artefacts for each phase. The application development system may also recommend, to the application developer, an artefact, for each phase, which may be best possible artefact for development of the IoT application. The best possible artefact may be provided based on expert analysis, or a combination of the expert analysis and the feedback. For example, maximum rated artefact may be recommended to the application developer for each phase.

Based on the selection of the artefacts by the application developer, the artefacts may be associated or linked with the phases of the IoT application. For example, the artefact belonging to the sensing phase may be associated with the artefact belonging to the extraction phase. Similarly, the artefact belonging to the extraction phase may be associated with the artefact belonging to the analysis phase.

Figure 1:
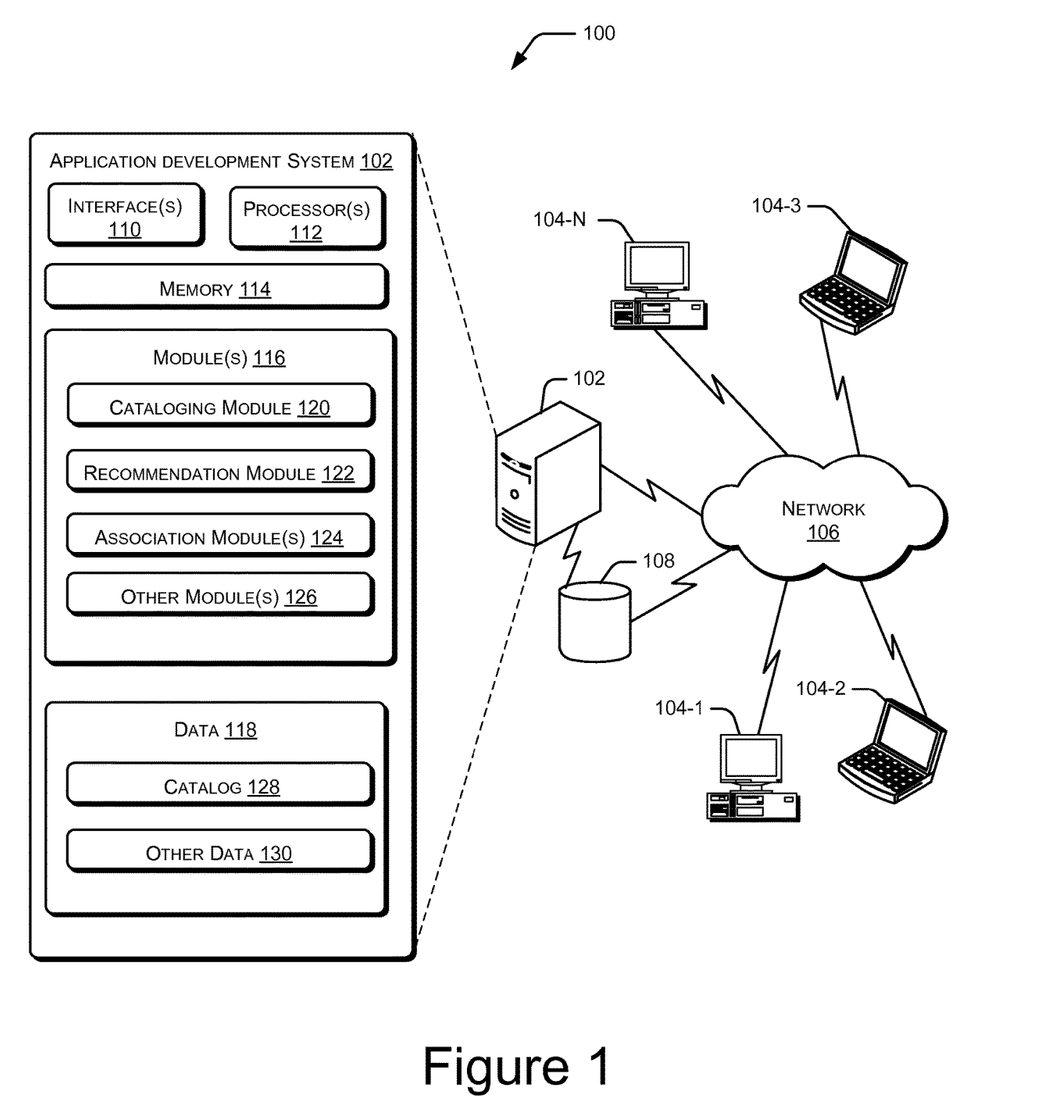
FIG. 1 illustrates a network environment implementing an application development system, in accordance with an embodiment of the present subject matter.

Since artefacts developed by the algorithm or application developers are stored in the knowledge database, the application development system facilitates the application developers to develop IoT applications using the knowledge database, thereby maximizing the reuse of the artefacts and saving a lot of time and resources. Further, since the IoT application is developed based on recommendations and expert analysis provided by the application development system, application developers can easily and accurately develop the IoT applications. FIG. 1 illustrates a network environment 100 implementing an application development system 102, in accordance with an embodiment of the present subject matter. In said embodiment, the network environment 100 includes the application development system 102 configured to developing an Internet of Things (IoT) application for an application developer.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The application development system 102 may be implemented in a variety of computing systems, such as a laptop computer, a desktop computer, a notebook, a workstation, a mainframe computer, a server, a network server, and the like. In one implementation, the application development system 102 may be included within an existing information technology infrastructure. Further, it will be understood that the application development system 102 may be connected to a plurality of user devices 104-1, 104-2, 104-3, . . . , 104-N, collectively referred to as user devices 104 and individually referred to as a user device 104. The user device 104 may include, but is not limited to, a desktop computer, a portable computer, a mobile phone, a handheld device, and a workstation. The user devices 104 may be used by users, such as programmers, algorithm developers, subject matter experts, application developers, software architects, clients or customers, and the like.

As shown in FIG. 1, the user devices 104 are communicatively coupled to the application development system 102 over a network 106 through one or more communication links for facilitating one or more end users to access and operate the application development system 102. In one implementation, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

The network environment 100 further comprises a knowledge database 108 communicatively coupled to the application development system 102. The knowledge database 108 may store a plurality of artefacts and metadata associated with each of the artefacts. The artefacts may include algorithms, functions, source codes, configuration scripts etc. The metadata for an artefact may include, but is not limited to, a type of sensor and a use case for which the artefact is developed, and a domain of the algorithm, such as banking, a manufacturing or an insurance domain. In one implementation, feedback associated with the artefacts may also be stored in the knowledge database 108.

Although the knowledge database 108 is shown external to the application development system 102, it will be appreciated by a person skilled in the art that the knowledge database 108 can also be implemented internal to the application development system 102.

The application development system 102 further includes interface(s) 110. Further, the interface(s) 110 may include a variety of software and hardware interfaces, for example, interfaces for peripheral device(s), such as a product board, a mouse, an external memory, and a printer. Additionally, the interface(s) 110 may enable the application development system 102 to communicate with other devices, such as web servers and external repositories. The interface(s) 110 may also facilitate multiple communications within a wide variety of networks and protocol types, including wired networks, for example, LAN, cable, etc., and wireless networks, such as WLAN, cellular, or satellite. For the purpose, the interface(s) 110 may include one or more ports.

In an implementation, the application development system 102 includes processor(s) 112 coupled to a memory 114. The processor(s) 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 may be configured to fetch and execute computer-readable instructions stored in the memory 114.

The memory 114 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the application development system 102 includes module(s) 116 and data 118. The module(s) 116 include, for example, a cataloging module 120, a recommendation module 122, an association module 124 and other module(s) 126. The other modules 126 may include programs or coded instructions that supplement applications or functions performed by the application development system 102. The data 118 may include catalog 128 and other data 130. The other data 130, amongst other things, may serve as a repository for storing data that is processed, received, or generated as a result of the execution of one or more modules in the module(s) 116.

According to an implementation, the cataloging module 120 of the application development system 102 may be configured to receive a plurality of artefacts and metadata associated with each of the artefacts from various algorithm or application developers and store the same in the knowledge database 108. The artefacts may interchangeably be referred to as reusable artefacts. The artefacts may include algorithms, functions, source codes, configuration scripts etc. The metadata for an artefact may include, but not limited to, a type of sensor and a use case for which the artefact is developed, and a domain of the algorithm, such as banking, a manufacturing or an insurance domain.

Further, the plurality of artefacts may be pertaining to different phases of an IoT application. As indicated earlier, all IoT applications, interchangeably referred to as applications, encompass some phases, such as one or more of a sensing phase, an extraction phase, an analysis phase, and a response phase. In the sensing phase, the application may sense or collect data using sensors. In the extraction phase, the application processes the data to extract relevant information. Then the application analyzes the extracted data in the analysis phase and finally notifies the analyzed data to user(s) in the response phase. Therefore, for development of any IoT application, artefacts are created for each phase. For example, a fire management application collects data using smoke sensors and temperature sensors. The application then extracts data, such as level of smoke and then analyses the extracted data to check, for example if there is increase in the level of smoke beyond the maximum limit. Finally, the application notifies the final result to users. For example, if there is increase in the smoke level, then the fire management application notifies residents of the building and whole of the neighborhood through a set of alarms and warning lights.

In one implementation, the cataloging module 120 may further be configured to receive feedback associated with the artefacts, from the algorithm or application developers. The cataloging module 120 may store the feedback in the knowledge database 108. The feedback may also be received from users of the artefacts. In an example, the feedback may be received in form of ratings, such as poor, average, good, very good, and excellent. In another example, the feedback may be received in form of scores, such as score out of 5. The algorithm developers or the users of the artefacts may provide the feedback based on certain parameters, such as success rate of the artefact, use case, and frequency of the being used. Therefore for different scenarios, different feedback is received for an artefact. For example, if an application is to be built for night time, then a feedback may be received considering this parameter. In said example, based on this parameter, an artefact may receive a feedback as very good and another artefact may receive a feedback as average.

Furthermore, the cataloging module 120 may be configured to index the artefacts in the knowledge database 108 based on the metadata. As a result, one or more groups are determined. For example, the artefacts belonging to same type of sensors, domain, and phase are grouped together. The one or more groups can be named as, say, group A, group B, group C, group D, and so on. In an example, the group A includes artefacts belonging to the extraction phase, which are capable of extracting information, in night time, from data captured by a camera. In another example, group B includes artefacts belonging to the extraction phase, which are capable of extracting information, in night time, from data captured by a smoke sensor. In yet another example, group C includes artefacts belonging to the analysis phase, which are capable of extracting information, in day time, from data captured by a camera. Indexing enables easy retrieval of the artefacts when an application developer develops an IoT application. The indexed artefacts are stored as the catalog 128 and can be retrieved by the application development system 102 for the purpose of developing the IoT application. The manner in which the application development system 102 develops the IoT application is described henceforth.

When an IoT application is to be developed, cataloging module 120 receives an input from an application developer. The input may be a dataset and one or more tasks to be performed by the IoT application to be developed. The dataset may include different phases which will be involved, types of sensors which may be apt for the one or more tasks, subject on which the one or more tasks are performed, and scenario in which the tasks are to be performed. For example, if an application developer wants to build an IoT application for recognition of number plate of a car in night, then the input can include a task as Binarization and a dataset comprising an image of the number plate to be recognized, camera as a sensor, subject as a small area, image type as still, scenario will be night time.

Based on the input, the cataloging module 120 retrieves the groups of reusable artefacts, from the catalog 128, pertaining to the dataset and the one or more tasks. As indicated in the above example, the input can include a task as Binarization and a dataset comprising an image of the number plate to be recognized, camera as a sensor, subject as a small area, image type as still, scenario will be night time. Therefore, based on the input, the cataloging module 120 may retrieve group A. As mentioned previously, the group A includes artefacts belonging to extraction phase, which are capable of extracting information, in night time, from data captured by a camera. Further, the cataloging module 120 may be configured to retrieve feedback associated with the artefacts from the knowledge database 108.

Based on the retrieved artefacts and feedback associated with each of the artefacts, the recommendation module 122 recommends, to the application developer, artefacts from amongst the retrieved artefacts, based on the feedback. As indicated previously, the feedback may be received in the form of ratings, such as poor, average, good, very good, and excellent or in the form of scores, such as score out of 5. In a case, when the feedback is received in form of ratings then highly rated artefacts may be recommended to the application developer. The highly rated artefacts may be understood as the artefacts which have received rating either as very good or excellent. In another case, when the feedback is received in form of scores then highly scored artefacts may be recommended to the application developer. The highly scored artefacts may be understood as the artefacts which have received score of 3 or above, out of 5. Taking an example, when the recommendation module 122 retrieves group A, feedback is received in form of ratings, group A includes 10 algorithms, out of which 6 algorithms have received rating either as very good or excellent, then the recommendation module 122 may recommend these 6 algorithms to the application developer. Similarly, if the recommendation module 122 also retrieves group B and group C. Then, the recommendation module 122 may also recommend algorithms which are highly rated from amongst the algorithms present in the groups B and C.

Subsequently, the recommendation module 122 receives selected artefacts from amongst the recommended artefacts from the application developer. The application developer may select the artefacts based on complexity, processing time, and the like. Further, the recommendation module 122 may also recommend an artefact for each phase, from amongst the retrieved artefacts, to the application developer. The artefacts may be best possible artefacts for development of the IoT application. For example, maximum rated artefact may be recommended to the application developer, for each phase. The best possible artefact may be provided based on expert analysis, or a combination of the expert analysis and the feedback.

Based on the selected artefacts by the application developer or best possible artefacts, the association module 124 may be configured to associate or link the artefacts with the phases of the IoT application. For example, the artefact belonging to the sensing phase may be associated with the artefact belonging to the extraction phase. Similarly, the artefact belonging to the extraction phase may be associated with the artefact belonging to the analysis phase.

Since artefacts developed by algorithm developers are stored in the knowledge database 108. The application development system 102 facilitates numerous application developers to develop IoT applications using the knowledge database 108, thereby maximizing the reuse of the artefacts and saving a lot of time and resources. Further, since the IoT application is developed based on recommendations and expert analysis provided by the application development system 102, application developers can easily and accurately develop the IoT applications.

Figure 2A:
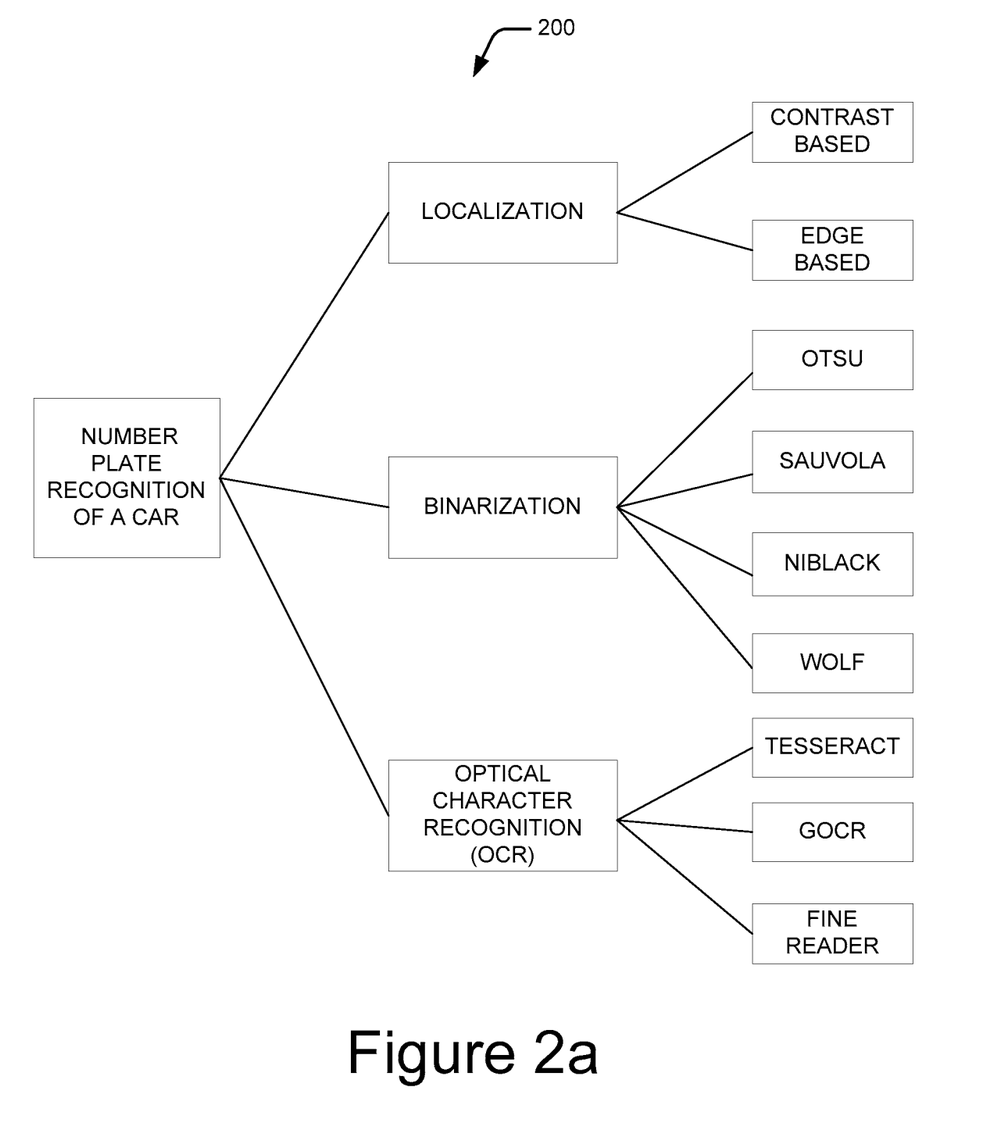
FIGS. 2a and 2b illustrate an example of development of an Internet of Things (IoT) application, in accordance with an embodiment of the present subject matter.
Figure 2B:
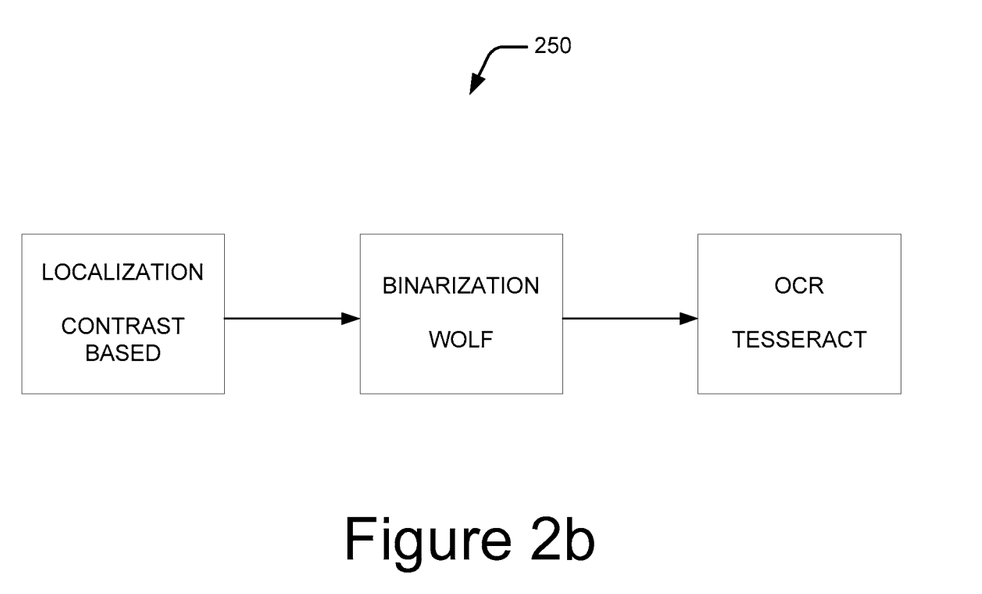

FIGS. 2a and 2b illustrate an example of development of an Internet of Things (IoT) application, in accordance with an embodiment of the present subject matter.

The IoT application to be developed is related to a smart building night car automation project, i.e., to identify, corresponding to a number plate of a car, related number plate from amongst the number plates of the cars in a parking lot. As shown in the FIG. 2a, pictorial representation 200 depicts an algorithm tree for development of the IoT application. The application development system 102 receives, from an application developer, dataset and one or more tasks to be performed by the IoT application being developed. The dataset includes an image of the number plate to be recognized, camera as a sensor, subject as a small area, since the number plates are a small region of interest (ROI), image type as still, scenario will be night time, i.e., the application should work well in low light. The tasks include localization, Binarization, and optical character recognition (OCR). Based on the input, the application development system 102 retrieves all algorithms, pertaining to the input, from the knowledge database 108.

As shown in the FIG. 2a, two algorithms are retrieved for the localization task, i.e., a contrast based algorithm and an edge based algorithm. Further, four algorithms are retrieved for the Binarization task. The four algorithms include an Otsu algorithm, a Sauvola algorithm, a Niblack algorithm, and a wolf algorithm. The OCR task includes three algorithms, i.e., a Tesseract algorithm, a GOCR algorithm, and a fine reader algorithm. The application development system 102 may then analyze the 24 different combinations of algorithms (2*4*3=24) based on the feedback received for each algorithm and recommend highly rated algorithms to the application developer. The application developer may select the algorithms from amongst the highly rated algorithms to develop the IoT application. The application development system 102 may also provide best possible algorithms to the application developer, based on expert analysis, or a combination of the expert analysis and the feedback. The application development system 102 may then associate the selected or the best possible algorithms to develop the IoT application.

In FIG. 2b, pictorial representation 250 depicts association of the best possible algorithms to develop the IoT application. As shown in the FIG. 2b, for the localization task, the contrast based algorithm is the best possible algorithm from amongst the contrast based algorithm and the edge based algorithm. For the Binarization task, the wolf algorithm is the best possible algorithm from amongst the Otsu algorithm, the Sauvola algorithm, the Niblack algorithm, and the wolf algorithm. For the OCR task, the Tesseract algorithm is the best possible algorithm from amongst the GOCR algorithm, the fine reader algorithm, and the Tesseract algorithm. These algorithms are then associated together to develop the IoT application to identify, corresponding to a number plate of a car, related number plate from amongst the number plates of the cars in the parking lot.

Figure 3:
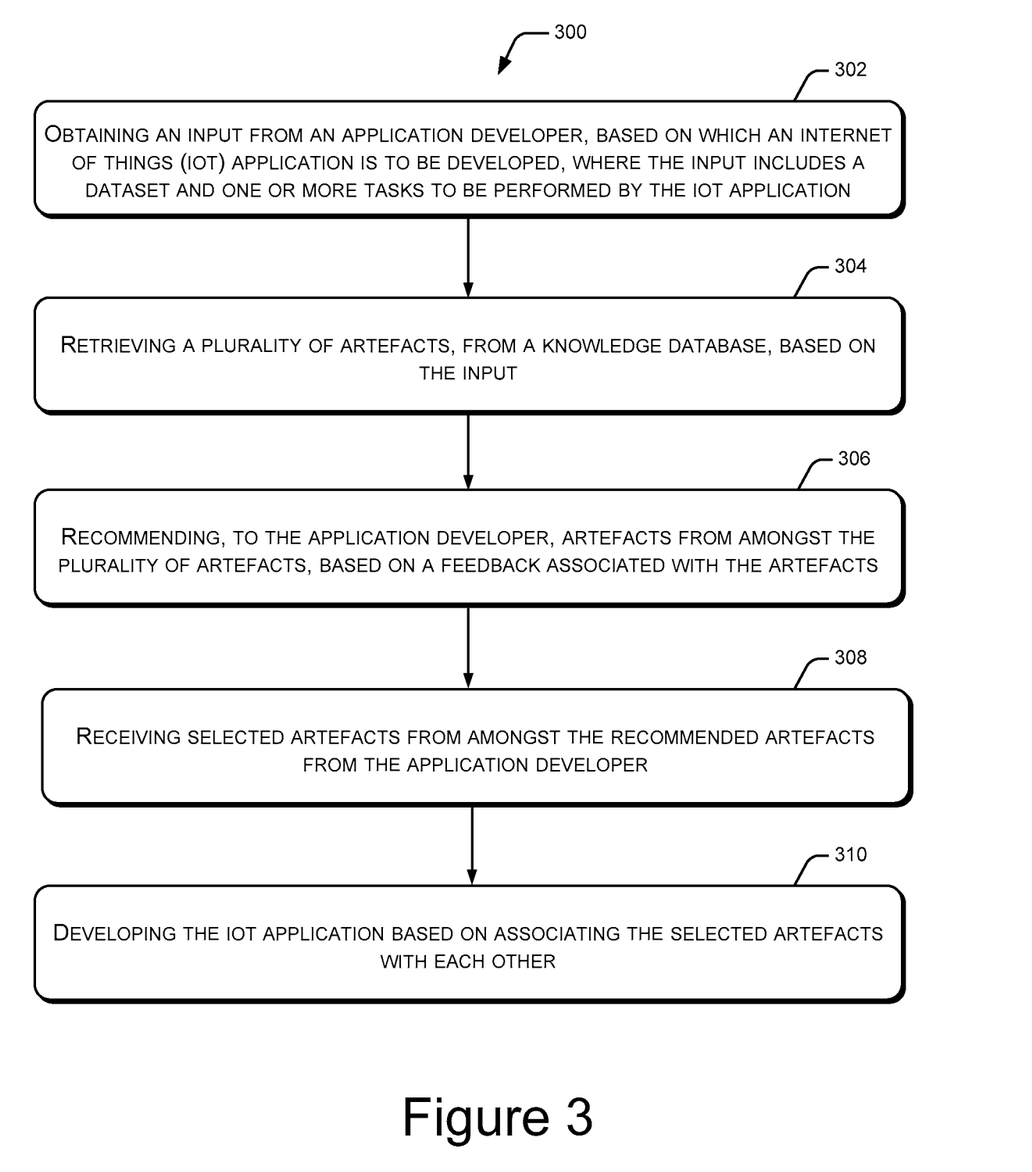
FIG. 3 illustrates a method for development of the IoT application, in accordance with the embodiment of the present subject matter.

FIG. 3 illustrates a method 300 for development of an IoT application, in accordance with the embodiment of the present subject matter. The method 300 is implemented in computing device, such as an application development system 102. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network.

The order in which the method 300 is described is not intended to be construed as a limitation, and any number of the described method blocks can be combined in any order to implement the method, or an alternative method. Furthermore, the method can be implemented in any suitable hardware, software, firmware or combination thereof.

At block 302, the method 300 includes obtaining an input from an application developer, based on which an internet of things (IoT) application is to be developed, where the input includes a dataset and one or more tasks to be performed by the IoT application. The dataset may include different phases which will be involved, types of sensors which may be apt for the one or more tasks, subject on which the one or more tasks are to be performed, and scenario in which the one or more tasks are to be performed. For example, if an application developer wants to build an IoT application for recognition of number plate of a car in night, then the input may include a dataset comprising an image of the number plate to be recognized, camera as a sensor, subject as a small area, image type as still, and scenario will be night time. The input may further include one or more tasks, such as Binarization and localization. In one implementation, the cataloging module 120 obtains the dataset from the application developer.

At block 304, the method 300 includes retrieving a plurality of artefacts, from a knowledge database 108, based on the input. As indicated in the above block 302, if an application developer wants to build an IoT application for recognition of number plate of a car in night, then the input can include dataset comprising an image of the number plate to be recognized, camera as a sensor, subject as a small area, image type as still, scenario will be night time. The input may further include task, such as Binarization. Therefore, based on the input, a plurality of artefacts is retrieved from the knowledge database 108. In an implementation, the artefacts may be retrieved based on comparing the input with metadata. According to an implementation, the cataloging module 120 is configured to retrieve the plurality of artefacts from the knowledge database 108, based on the input.

At block 306, the method 300 includes recommending, to the application developer, artefacts from amongst the plurality of artefacts, based on a feedback associated with the artefacts. The feedback, for each of the artefacts, may be in the form of ratings, such as poor, average, good, very good, and excellent. The highly rated artefacts may be recommended to the application developer. The highly rated artefacts may be understood as the artefacts which have received rating either as very good or excellent. In one implementation, the recommendation module 122 recommends highly rated artefacts to the application developer.

At block 308, the method 300 includes receiving selected artefacts from amongst the recommended artefacts from the application developer. The application developer may select the artefacts based on complexity, processing time, and the like. For example, if ten artefacts are recommended to the application developer, then the application developer may select five artefacts from amongst the ten artefacts. In one implementation, the recommendation module 122 receives selected artefacts from amongst the recommended artefacts from the application developer.

At block 310, the method 300 includes developing the IoT application based on associating the selected artefacts with each other. The artefacts may be associated with each other based on the phases of the IoT application. For example, the artefact belonging to sensing phase may be associated with the artefact belonging to the extraction phase. Similarly, the artefact belonging to extraction phase may be associated with the artefact belonging to the analysis phase. In one implementation, the association module 124 may be configured to associate the artefacts with each other to develop the IoT application.

Since artefacts developed by algorithm or application developers are stored in the knowledge database 108. The application development system 102 facilitates numerous application developers to develop IoT applications using the knowledge database 108, thereby maximizing the reuse of the artefacts, and saving a lot of time and resources. Further, since the IoT application is developed based on recommendations and expert analysis provided by the application development system 102, application developers can easily and accurately develop the IoT applications.

Although embodiments for methods and systems for developing the IoT application have been described in a language specific to structural features and/or methods, it is to be understood that the invention is not necessarily limited to the specific features or methods described. Rather, the specific features and methods are disclosed as exemplary embodiments for developing the IoT application.

We claim:

1. A method for developing an Internet of Things (IoT) application, the method comprising:
   receiving a dataset and a functionality to be performed on data in the dataset provided by an application developer as an input, wherein the functionality to be performed on the data in the dataset comprises one or more tasks to be performed by the IoT application to be developed, and wherein the dataset comprises one or more phases of the IoT application from a plurality of phases of the IoT application, types of sensors for the one or more tasks, a subject on which the one or more tasks are to be performed, and a scenario in which the one or more tasks are to be performed, wherein the one or more phases of the IoT application include a sensing phase, an extraction phase, an analysis phase, and a response phase;
   retrieving a plurality of reusable artefacts corresponding to a plurality of phases of the IoT application from a knowledge database based on the one or more tasks to be performed by the IoT application to be developed and based on the application developer's input, and wherein the plurality of reusable artefacts is retrieved by comparing the application developer's input and the one or more tasks with metadata associated with each of the plurality of reusable artefacts, wherein the metadata associated with each of the plurality of reusable artefacts includes a type of sensors, a use case, and a domain, and wherein the plurality of reusable artefacts related to same type of sensors, same domain, and same phase are grouped together, recommending an artefact for each phase, from amongst the plurality of reusable artefacts to the application developer, based on at least one of feedback associated with each of the plurality of reusable artefacts and expert analysis, wherein the feedback comprises feedback from application developers, algorithm developers and users of the artefacts, and wherein the feedback is based on frequency of use, success rate and the use case of the reusable artefacts;

receiving selected artefacts for each phase of the IoT application from amongst the recommended artefacts from the application developer;

associating a reusable artifact of the selected artifacts belonging to the sensing phase with a reusable artifact of the selected artefacts belonging to the extraction phase;

associating the reusable artifact of the selected artifacts belonging to the extraction phase with a reusable artifact of the selected artefacts belonging to the analysis phase; and developing the IoT application based on associating the selected artefacts with each other based on the plurality of phases of the IoT application.

2. The method as claimed in claim 1 further comprising:
storing the plurality of reusable artefacts and the metadata associated with each of the plurality of reusable artefacts in the knowledge database; and
indexing the plurality of reusable artefacts in the knowledge database in real-time during development of the IoT application, wherein the indexing is performed based on the metadata.

3. The method as claimed in claim 1, wherein the feedback is in form of ratings.

4. The method as claimed in claim 1, wherein recommending an artefact for each phase includes autonomously selecting from amongst the plurality of reusable artefacts a respective artefact for each phase based on the feedback associated with each of the plurality of reusable artefacts, wherein the feedback includes feedback regarding the respective suitability of the reusable artefacts derived from application developers, algorithm developers and users of the reusable artefacts.

5. An application development system for development of an Internet of Things (IoT) application comprising:
a processor;
a cataloging module executed by the processor to:
receive a dataset and a functionality to be performed on data in the dataset provided by an application developer as an input, wherein the functionality to be performed on the data in the dataset comprises one or more tasks to be performed by the IoT application to be developed, and wherein the dataset comprises one or more phases of the IoT application from a plurality of phases of the IoT application, types of sensors for the one or more tasks, a subject on which the one or more tasks are to be performed, and a scenario in which the one or more tasks are to be performed, wherein the one or more phases of the IoT application include a sensing phase, an extraction phase, an analysis phase, and a response phase;

retrieve a plurality of reusable artefacts corresponding to a plurality of phases of the IoT application from a knowledge database based on the one or more tasks to be performed by the IoT application to be developed and based on the application developer's input, and wherein the plurality of reusable artefacts is retrieved by comparing the application developer's input and the one or more tasks with metadata associated with each of the plurality of reusable artefacts, wherein the metadata associated with each of the plurality of reusable artefacts includes a type of sensors, a use case, and a domain, and wherein the plurality of reusable artefacts related to same type of sensors, same domain, and same phase are grouped together;

a recommendation module executed by the processor to:
recommend an artefact for each phase, from amongst the plurality of reusable artefacts to the application developer, based on at least one of feedback associated with each of the plurality of reusable artefacts and expert analysis, wherein the feedback comprises feedback from application developers, algorithm developers and users of the artefacts, and wherein the feedback is based on frequency of use, success rate and the use case of the reusable artefacts; and an association module executed by the processor to:
associate artefacts selected by the application developer with each other based on the plurality of phases of the IoT application for development of the IoT application by:
associating a reusable artifact of the selected artifacts belonging to the sensing phase with a reusable artifact of the selected artefacts belonging to the extraction phase; and
associating the reusable artifact of the selected artifacts belonging to the extraction phase with a reusable artifact of the selected artefacts belonging to the analysis phase.

6. The application development system as claimed in claim 5, wherein the reusable artefacts include one or more of algorithms, functions, configuration scripts, and source codes.

7. The application development system as claimed in claim 5, wherein the cataloging module further:
stores the plurality of reusable artefacts and the metadata associated with each of the plurality of reusable artefacts in the knowledge database; and
indexes the plurality of reusable artefacts in the knowledge database in real-time during development of the IoT application, wherein the indexing is performed based on the metadata.

8. The application development system as claimed in claim 5, wherein the recommendation module autonomously selects from amongst the plurality of reusable artefacts a respective artefact for each phase based on the feedback associated with each of the plurality of reusable artefacts, wherein the feedback includes feedback regarding the respective suitability of the reusable artefacts derived from application developers, algorithm developers and users of the reusable artefacts.

9. A non-transitory computer-readable medium having embodied thereon a computer program for executing a method comprising:

receiving, by an application development system, a dataset and a functionality to be performed on data in the dataset provided by an application developer as an input, wherein the functionality to be performed on the data in the dataset comprises one or more tasks to be performed by an IoT application to be developed, and wherein the dataset comprises one or more phases of the IoT application from a plurality of phases of the IoT application, types of sensors for the one or more tasks, a subject on which the one or more tasks are to be performed, and a scenario in which the one or more tasks are to be performed, wherein the one or more phases of the IoT application include a sensing phase, an extraction phase, an analysis phase, and a response phase;

retrieving, by the application development system, a plurality of reusable artefacts corresponding to a plurality of phases of the IoT application from a knowledge database based on the one or more tasks to be performed by the IoT application to be developed and based on the application developer's input, and wherein the plurality of reusable artefacts is retrieved by comparing the application developer's input and the one or more tasks with metadata associated with each of the plurality of reusable artefacts, wherein the metadata associated with each of the plurality of reusable artefacts includes a type of sensors, a use case, and a domain, and wherein the plurality of reusable artefacts related to same type of sensors, same domain, and same phase are grouped together;

recommending, by the application development system, an artefact for each phase, from amongst the plurality of reusable artefacts to the application developer, based on at least one of feedback associated with each of the plurality of reusable artefacts and expert analysis, wherein the feedback comprises feedback from application developers, algorithm developers and users of the artefacts, and wherein the feedback is based on frequency of use, success rate and the use case of the reusable artefacts;

receiving, by the application development system, selected artefacts for each phase of the IoT application from amongst the recommended artefacts from the application developer;

associating a reusable artifact of the selected artifacts belonging to the sensing phase with a reusable artifact of the selected artefacts belonging to the extraction phase;

associating the reusable artifact of the selected artifacts belonging to the extraction phase a the reusable artifact of the selected artefacts belonging to the analysis phase; and developing, by the application development system, the IoT application based on associating the selected artefacts with each other based on the plurality of phases of the IoT application.

10. The non-transitory computer-readable medium as claimed in claim 9, wherein recommending an artefact for each phase includes autonomously selecting by the application development system from amongst the plurality of reusable artefacts a respective artefact for each phase based on the feedback associated with each of the plurality of reusable artefacts, wherein the feedback includes feedback regarding the respective suitability of the reusable artefacts derived from application developers, algorithm developers and users of the reusable artefacts.

* * * * *